US006882359B1

United States Patent
Truc et al.

(10) Patent No.: US 6,882,359 B1
(45) Date of Patent: Apr. 19, 2005

(54) FILM SCANNER

(75) Inventors: James A. Truc, Eden Prairie, MN (US); Gregg J. Ovsak, Richfield, MN (US); Calvin A. Wright, Minnetonka, MN (US); Peter M. Wolter, St. Louis Park, MN (US); Richard A. Lundeen, Eden Prairie, MN (US); Douglas G. Knight, South St. Paul, MN (US); James M. Anderson, Lake Elmo, MN (US); Dennis A. Deutsch, Hastings, MN (US); John R. Severson, Minnetonka, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/537,240

(22) Filed: Mar. 28, 2000

(51) Int. Cl.⁷ .............................................. H04N 5/253
(52) U.S. Cl. ...................................................... 348/96
(58) Field of Search .............................. 348/96, 207.99, 348/207; 382/299; 358/505, 506, 513; H04N 5/253

(56) References Cited

U.S. PATENT DOCUMENTS

| | | | |
|---|---|---|---|
| 2,295,000 A | | 9/1942 | Morse |
| 4,205,337 A | * | 5/1980 | Millward ..................... 348/104 |
| 4,390,357 A | | 6/1983 | Myers et al. |
| 4,482,924 A | | 11/1984 | Brownstein |
| 4,639,787 A | | 1/1987 | Isogai et al. |
| 5,000,570 A | | 3/1991 | Neilson et al. |
| 5,010,410 A | | 4/1991 | Bernstein |
| 5,088,813 A | | 2/1992 | Wakefield |
| 5,091,963 A | | 2/1992 | Litt et al. |
| 5,157,482 A | | 10/1992 | Cosgrove |
| 5,282,036 A | | 1/1994 | Worley, Jr. et al. |
| 5,309,242 A | | 5/1994 | Asami et al. |
| 5,412,773 A | | 5/1995 | Carlucci et al. |
| 5,469,209 A | | 11/1995 | Gunday et al. |
| 5,477,353 A | * | 12/1995 | Yamasaki .................. 358/487 |
| 5,541,644 A | | 7/1996 | Nanba |
| 5,555,106 A | * | 9/1996 | Hsu ............................ 358/512 |
| 5,565,912 A | | 10/1996 | Easterly et al. |
| 5,574,577 A | * | 11/1996 | Wally et al. ................ 358/487 |
| 5,600,450 A | * | 2/1997 | Kaye et al. ................. 358/474 |
| 5,815,202 A | * | 9/1998 | Difrancesco ................. 348/97 |
| 5,844,226 A | * | 12/1998 | Suzuki .................... 235/462.01 |
| 5,872,591 A | | 2/1999 | Truc et al. |
| 5,874,988 A | * | 2/1999 | Gu .............................. 348/97 |
| 6,037,974 A | | 3/2000 | Truc et al. |
| 6,100,924 A | * | 8/2000 | Truc et al. .................... 348/96 |
| 6,172,704 B1 | * | 1/2001 | Kunishige .................... 348/96 |
| 6,236,389 B1 | * | 5/2001 | Imaizumi et al. ........... 345/788 |
| 6,301,002 B1 | * | 10/2001 | Manico et al. ................ 355/75 |
| 6,316,761 B1 | * | 11/2001 | Yamaguchi .............. 250/208.1 |
| 6,480,916 B1 | * | 11/2002 | Shishizuka et al. ......... 710/107 |
| 6,486,980 B1 | * | 11/2002 | Sawanobori ................ 358/487 |

FOREIGN PATENT DOCUMENTS

| | | |
|---|---|---|
| EP | 0 261 966 A | 3/1988 |
| EP | 0 859 327 A | 8/1998 |
| EP | 0 903 930 A | 3/1999 |
| EP | 0 982 652 | 3/2000 |

* cited by examiner

Primary Examiner—Nhon Diep
(74) Attorney, Agent, or Firm—Kinney & Lange; David A. Novais

(57) ABSTRACT

The image scanning system of the present invention scans slides and film strips containing photographic images and creates a corresponding plurality of digital representations of the photographic images. The system includes a touch screen monitor, a computer, a scanner, a high speed interface and a printer. The scanner includes a light source for projecting light through the film strip. A light sensor senses the light projected through the film strip and generates pixel data. A film drive advances the film strip between the light source and the light sensor. A lens located between the light source and the light sensor directs the light projected through the film strip onto the light sensor. The pixel data is transmitted through the high speed interface to the computer for processing operations. After the pixel data has been processed, digital images are displayed on the monitor and may also be printed out.

18 Claims, 9 Drawing Sheets

FILM SCANNER

CROSS-REFERENCE TO RELATED APPLICATION(S)

None.

BACKGROUND OF THE INVENTION

The present invention relates to an image scanning system, and particularly to a system that scans a strip of photographic film or mounted slide containing an image or images, and creates digital representations of the images.

There has been a continuing need for high speed and inexpensive film scanners that scan photographic film strips and slide mounts and generate high quality digital images. Pakon, Inc., the assignee of the present invention, has developed film scanners which are described in U.S. Pat. No. 5,872,591, and U.S. patent application Ser. No. 09/149,612, filed on Sep. 8, 1998, which are hereby incorporated by reference.

Due to the ever increasing processing power of personal computers, it would be desirable for a film scanning system to take advantage of this processing power for processing and manipulation of image data. In the past, there have been bandwidth limitations on the interface between film scanners and personal computers which have limited the ability of scanners to pass large bandwidth data to computers. In addition, computers did not have adequate processing power to quickly and efficiently process the data once received. Prior scanning systems have attempted to deal with this problem by reducing the color depth of the image data prior to transferring it to the computer for processing. However, a reduction in the color depth results in a reduction in image quality. It would be desirable for a film scanning system to make use of a high speed computer with a high-speed interface that allows large bandwidth image data to be transferred from the scanner to the personal computer without the need for reducing the color depth.

It would also be desirable for a scanning system to be scalable to take advantage of increasing computer speeds. By using the computer to perform most of the data processing operations, rather than the scanner itself, the speed of the scanning process can easily be scaled up by using a higher speed computer. Thus, increased performance may be obtained without having to change scanner hardware or software.

A further improvement that would be desirable in a scanning system would be for the system to use a distributed design that utilizes several microprocessor-based subsystems connected by a single ribbon cable, rather than a more central design with a single processor and numerous cables running throughout the scanner. A distributed design reduces the necessary cabling and the cost of the system.

In addition to speed limitations, another disadvantage of prior art scanners is that they are typically limited to scanning only one type of film, or they require attachments such as different film gates to scan different types of film. With the variety of films that are available today, it would be useful to have a single scanner that can scan different types of film and slides without changing the hardware configuration.

BRIEF SUMMARY OF THE INVENTION

The image scanning system of the present invention scans slides and film strips containing photographic images and creates a corresponding plurality of digital representations of the photographic images. The system includes a touch screen monitor, a computer, a scanner, a high speed interface and a printer.

The scanner includes a light source for projecting light through the film strip. A light sensor senses the light projected through the film strip and generates pixel data. A film drive advances the film strip between the light source and the light sensor. A lens located between the light source and the light sensor directs the light projected through the film strip onto the light sensor. Film type selection means are used to manually select a type of film to be scanned. Adjustment means responsive to the film type selection means automatically change the position of the lens and the position of the light sensor to provide proper focus for the selected film type. Film color selection means are used to manually select a film color, such as color positive, color negative, or black and white. The pixel data is transmitted through the high speed interface to the computer for processing operations, including line averaging, pixel normalization, down-sampling color correction, pixel smear correction and interleave demultiplexing. After the pixel data has been processed, digital images are displayed on the monitor and may also be printed out.

The scanning system of the present invention takes advantage of the increasing processing power of personal computers, and makes use of a high-speed interface that allows large bandwidth image data to be transferred from the scanner to the personal computer without the need for down-sampling. The scanning system is scalable to take advantage of increasing computer speeds. The scalable architecture allows for increased performance without having to change scanner hardware or software. The distributed design of the scanning system, which utilizes several microprocessor-based subsystems connected by a single ribbon cable, reduces the necessary cabling and the cost of the system. In addition, the scanning system of the present invention can scan different types of film and slides without the need for hardware configuration changes.

DETAILED DESCRIPTION

I. The Scanning Process

Figure 1:
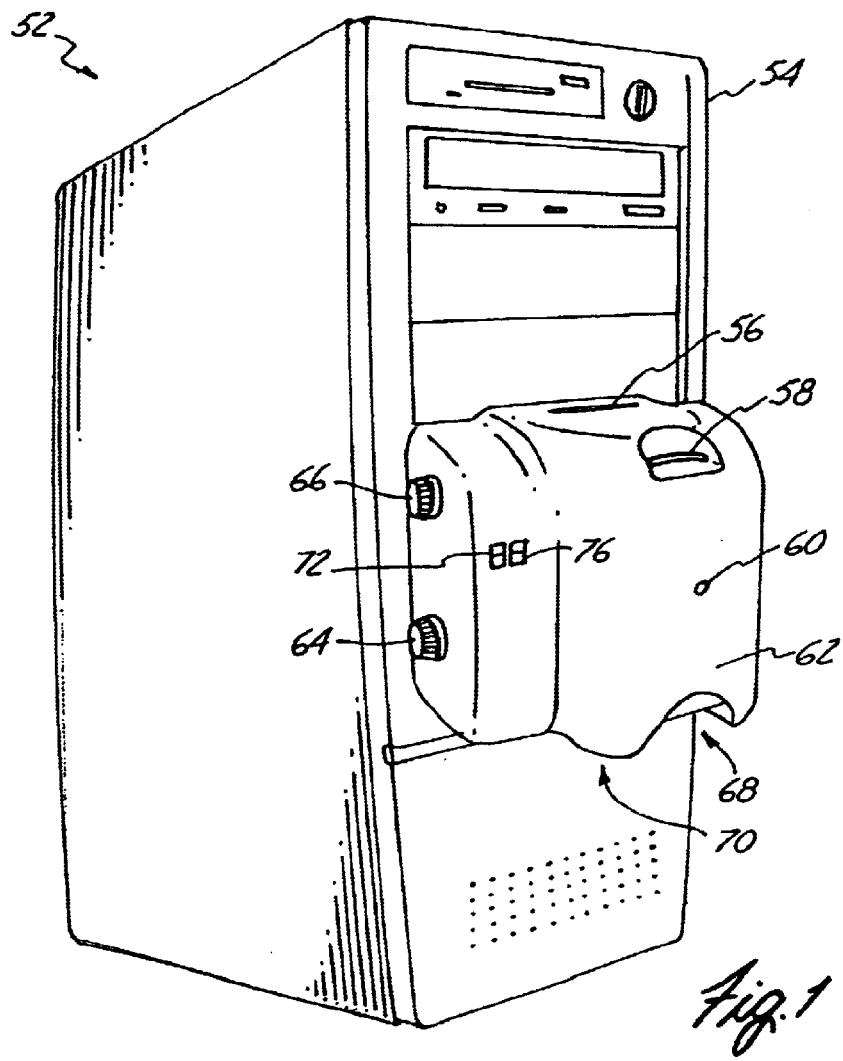
FIG. 1 shows a perspective view of a preferred embodiment of a scanning system according to the present invention.

FIG. 1 shows a perspective view of scanning system 52. Scanning system 52 includes computer 54 and embedded scanner 62. Scanner 62 includes slide inlet 56, film inlet 58, indicator light 60, film color knob 64, film size knob 66, film outlet 68, slide outlet 70, start/stop switch 72 and forward/reverse switch 76.

Scanner 62 is mounted on a front face of computer 54. Scanner 62 is designed to fit in three front-accessible bays of computer 54. Scanner 62 can scan virtually any type of film including 35 mm film, 46 mm film, APS film and mounted slides. Scanner 62 accommodates black and white film, color positive film and color negative film. Film scanned by scanner 62 can be either a complete roll of film, or a smaller strip of film, such as one containing only two frames. For 35 mm film, scanner 62 preferably accommodates 2 to 40 frames per strip. For APS film, scanner 62 preferably accommodates 15, 25 or 40 frames per strip.

A film strip is inserted into scanner 62 through film inlet 58. The film strip is transported through the scanner in a vertical direction and exits through film outlet 68 at the bottom of scanner 62. Film strips are preferably inserted with the emulsion side facing computer 54.

Mounted slides are inserted into scanner 62 through slide inlet 56. Mounted slides are also transported through scanner 62 in a vertical direction and exit the scanner through slide outlet 70 (not visible) at the bottom of scanner 62. Mounted slides are preferably inserted sideways to obtain maximum resolution. An attachment may be added to scanner 62 to allow automatic feeding of slide mounts into scanner 62.

Film size knob 66 is rotatably mounted on scanner 62. Film size knob 66 is used to select the type of film that will be scanned. In a preferred embodiment, film size knob 66 includes a first position and a second position. The first position of film size knob 66 indicates that 35 mm film is to be scanned. The second position of film size knob 66 indicates that APS film is to be scanned. Film size knob 66 is rotated to the proper position prior to inserting a film strip in film inlet 58. Film size knob 66 is coupled to guide track 343 (see FIGS. 6–7 and corresponding description), which guides film strips through scanner 62. The width of guide track 343 is manually adjustable by film size knob 66 to accommodate different types of film. If film size knob 66 is in the position corresponding to 35 mm film, the width of guide track 343 is the same as the width of a 35 mm film strip. If film size knob 66 is in the position corresponding to APS film, the width of guide track 343 is the same width as an APS film strip. The movement of guide track 343 in response to movement of film size knob 66 is discussed in more detail below with respect to FIGS. 6–7.

The two positions of film size knob 66 may alternatively be used for film types other than 35 mm and APS. For example, as will be described below, a 35 mm/46 mm attachment may be added to scanner 62, which sets the two positions of film size knob 66 to a 35 mm film position and a 46 mm film position. Additional positions may be added to accommodate more than two film types.

Film color knob 64 is also rotatably mounted on scanner 62, and is used to further classify the type of film to be inserted in scanner 62. Film color knob 64 preferably has three positions—a first position corresponds to negative film, a second position corresponds to positive film and a third position corresponds to black and white film. Film color knob 64 is coupled to cams 360 (see FIGS. 6–8) within scanner 62. Cams 360 control the position of positive filter 214 (see FIGS. 7–8). Positive filter 214 prevents saturation of light sensor 124 (see FIGS. 9–10). Cams 360 and positive filter 214 are discussed in further detail below with respect to FIGS. 6–8.

Figure 6:
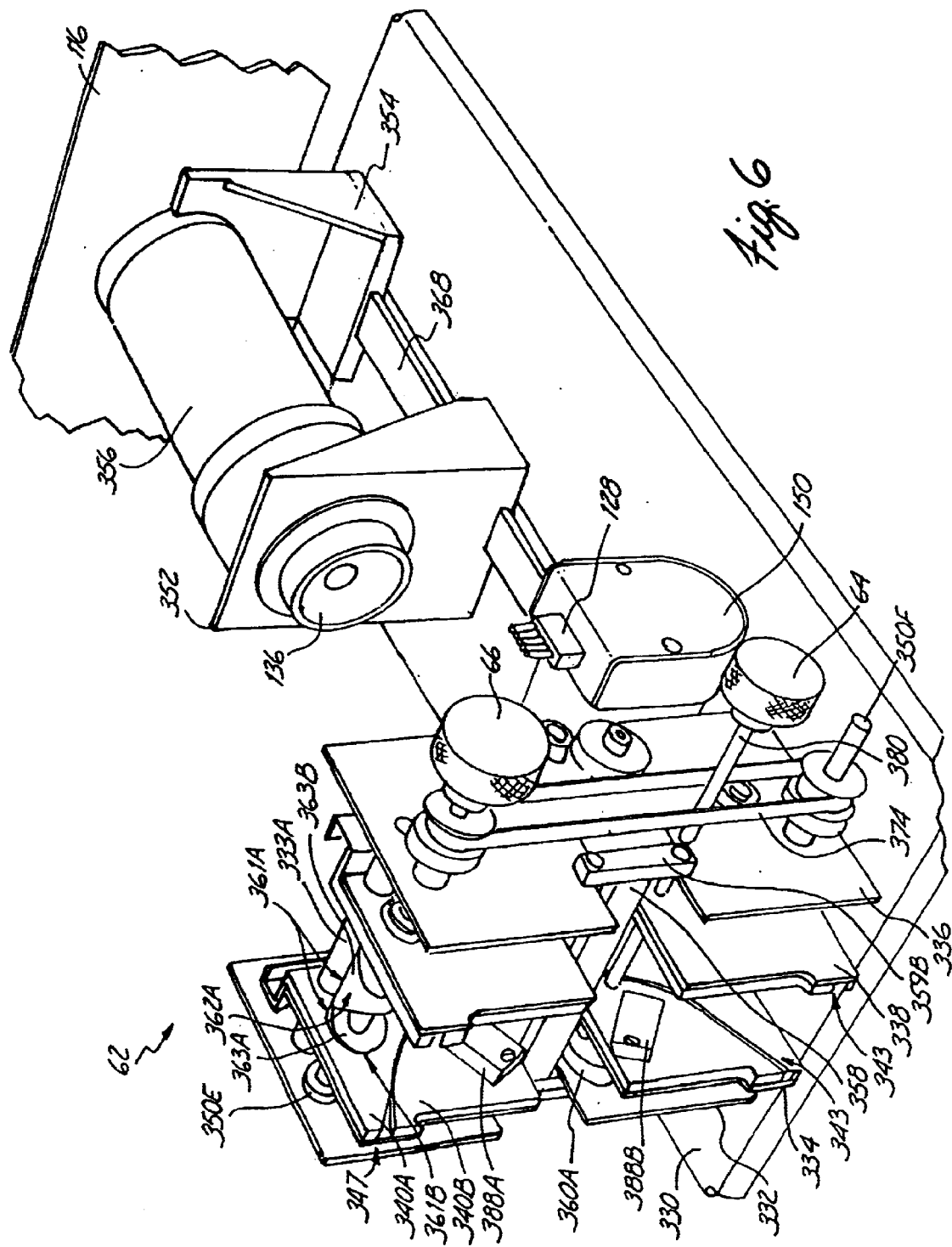
FIG. 6 shows a perspective view of the right side of the scanner of the present invention.
Figure 7:
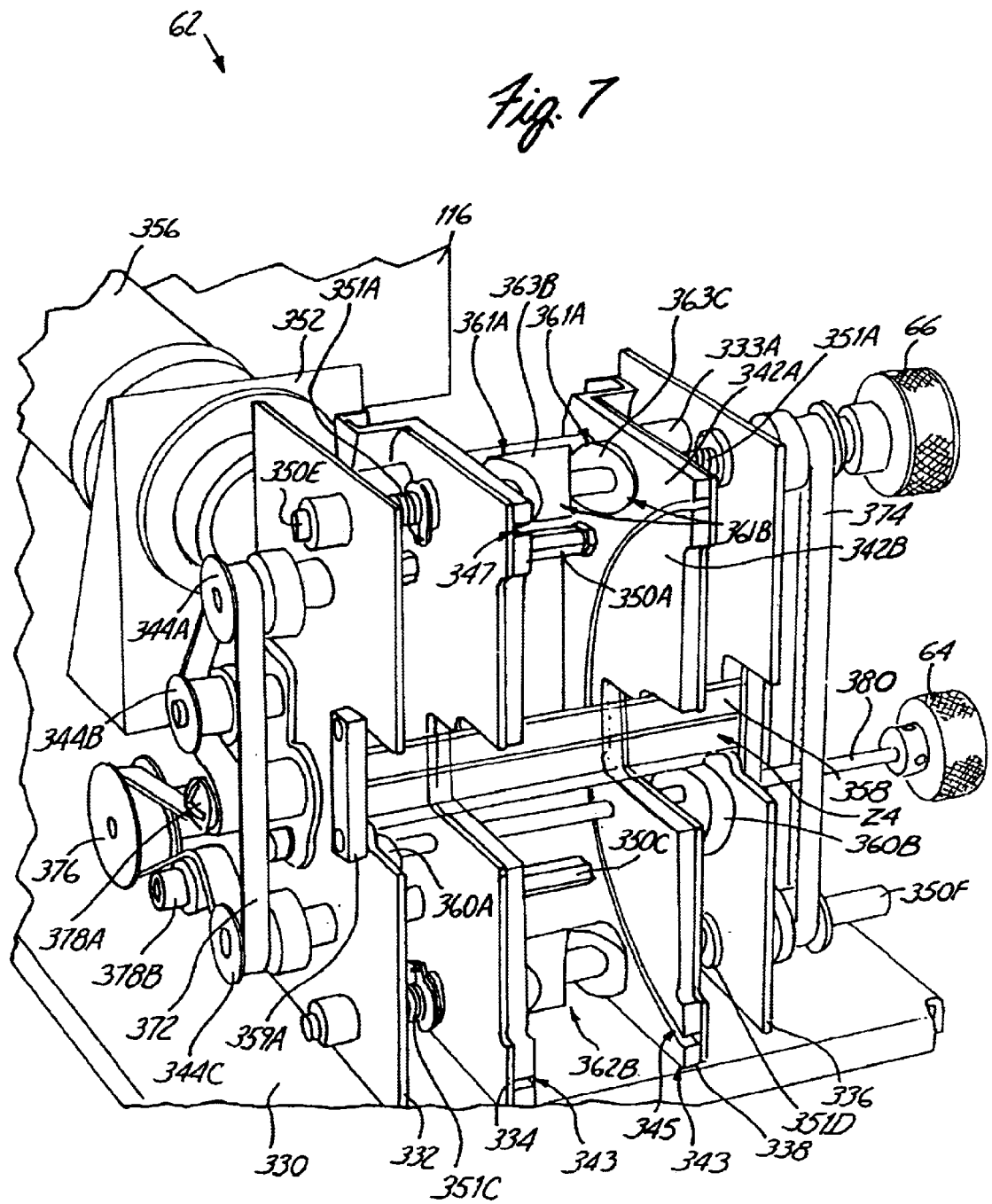
FIG. 7 shows a perspective view of the left side of the scanner of the present invention.
Figure 9:
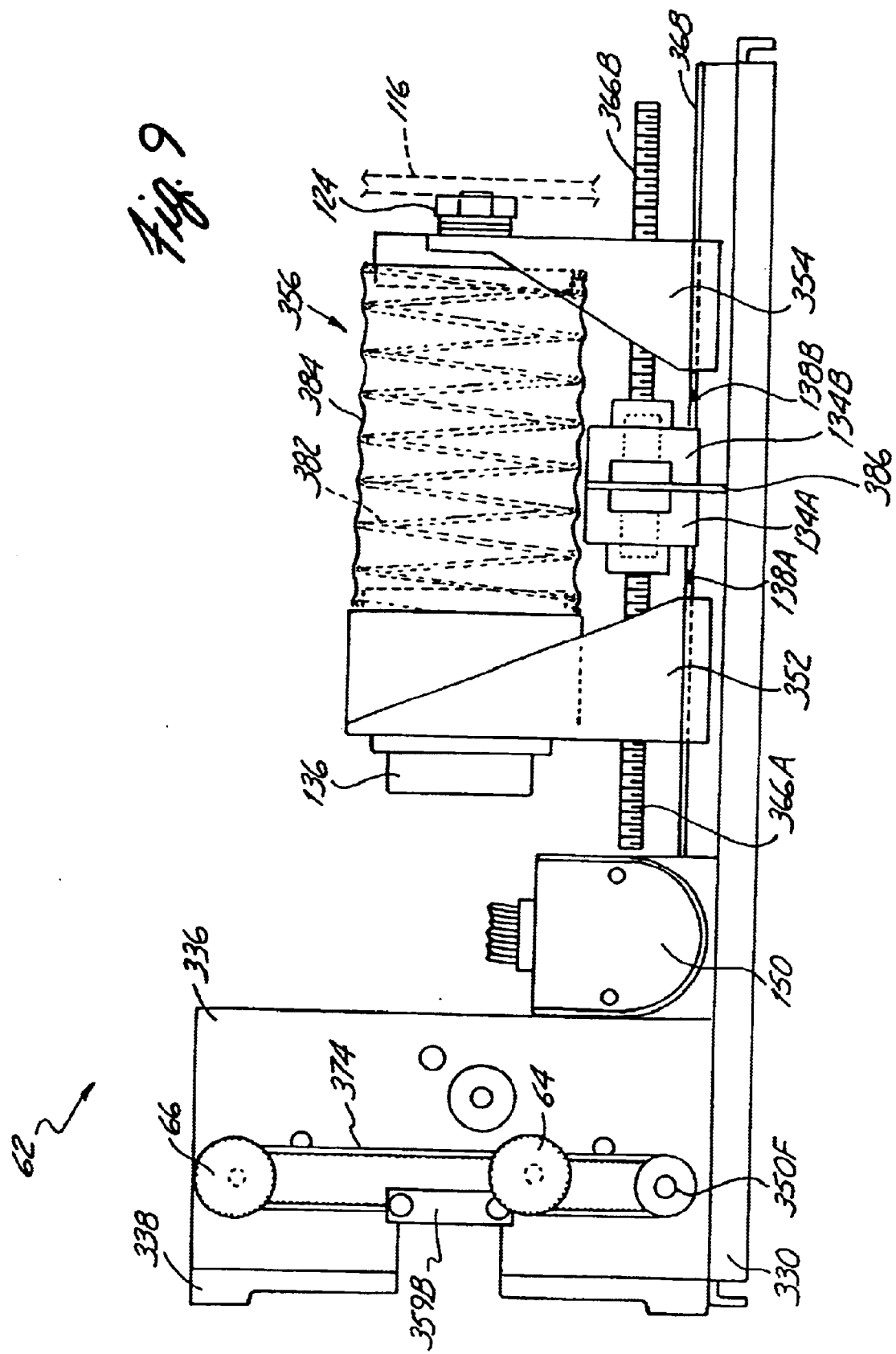
FIG. 9 shows a side view of the right side of the scanner of the present invention.

Knobs 64 and 66 may be placed on either side of scanner 62. In FIGS. 6, 7 and 9, knobs 64 and 66 are shown as being mounted on the right side of scanner 62.

Start/stop switch 72 and forward/reverse switch 76 are preferably double throw rocker switches. Pushing start/stop switch 72 into the start position causes a scan sequence to be initiated. Pushing start/stop switch 72 into the stop position stops the transport of a film strip. The direction of film transport is controlled with forward/reverse switch 76.

Indicator light 60 flashes when scanner 62 is first powered-up and while scanner 62 warms up and performs a self-check, and then remains on until power to scanner 62 is turned off. Scanner 62 uses the same power supply as computer 54 and is powered-up when computer 54 is powered-up.

Figure 2:
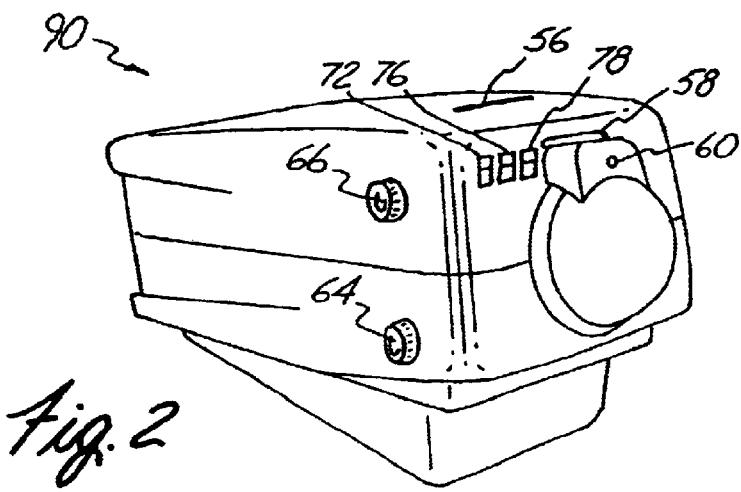
FIG. 2 shows a perspective view of a preferred embodiment of a stand-alone scanner according to the present invention.

FIG. 2 shows a perspective view of stand-alone scanner 90. Scanner 90 includes slide inlet 56, film inlet 58, indicator light 60, film color knob 64, film size knob 66, start/stop switch 72, forward/reverse switch 76 and power switch 78. Stand-alone scanner 90 includes all of the same scanning hardware and functionality as scanning system 52, but in a single desktop package. Thus, the hardware and functionality of the scanning system of the present invention will be discussed with reference to scanning system 52.

Figure 3:
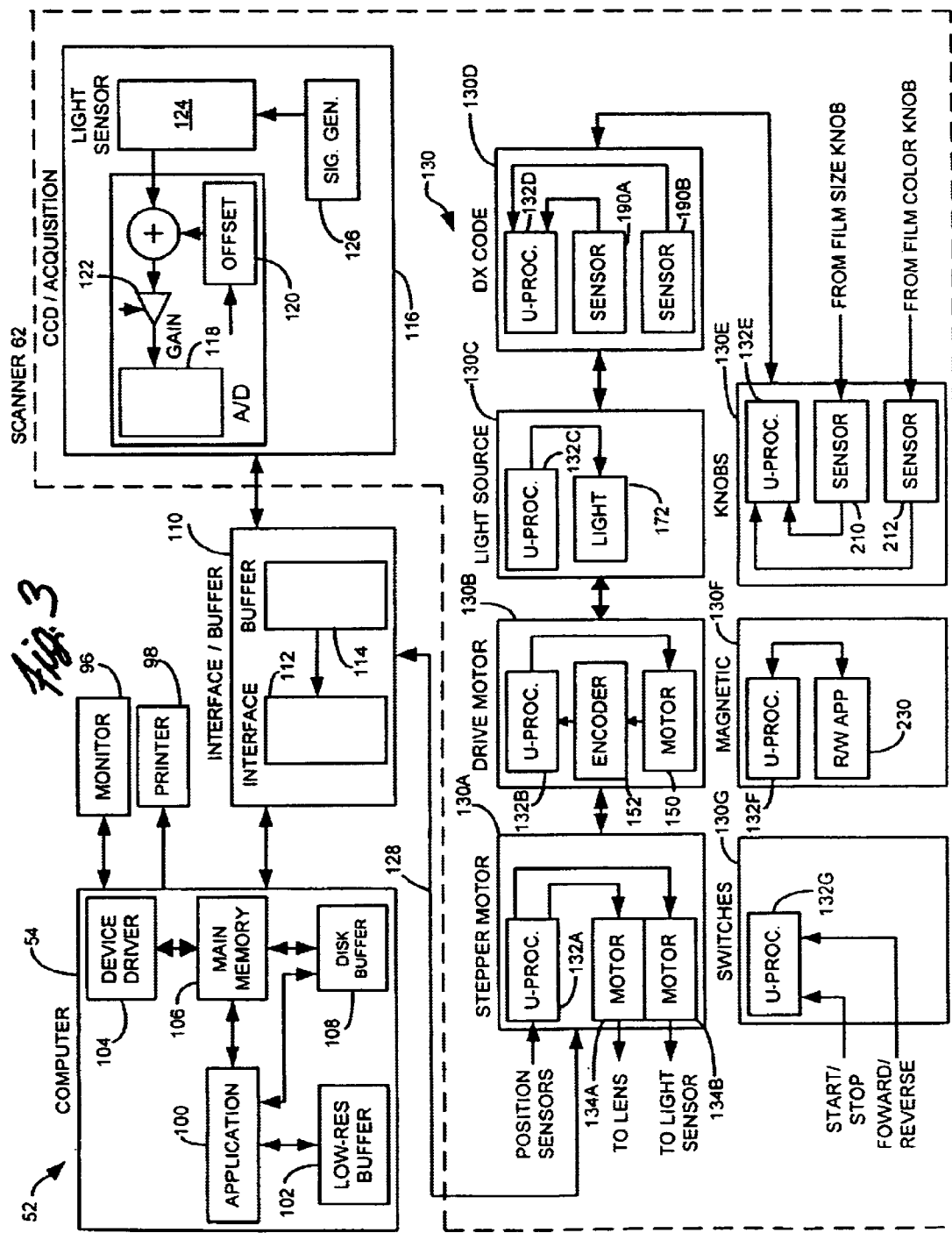
FIG. 3 shows a block diagram of the scanning system of the present invention.

FIG. 3 shows a block diagram of scanning system 52. Scanning system 52 includes computer 54, monitor 96, printer 98, interface/buffer board 110 and scanner. 62.

Computer 54 includes application 100, low-resolution buffer 102, device driver 104, main memory 106 and disk buffer 108. Computer 54 preferably includes a microprocessor having performance at least comparable to a 350 MHz Pentium II processor. Computer 54 communicates with scanner 62 with the aid of device driver 104. Device driver 104 converts data that are received from scanner 62 to a format that can be understood and used by computer 54, and converts data that is sent from computer 54 to data that can be understood and used by scanner 62. Application program 100 running on computer 54 receives and processes commands entered by a user, manages and manipulates image intensity data, and outputs images to monitor 96 and/or printer 98. For commands that require communication with scanner 62, application program 100 passes the commands to device driver 104, which converts the commands to data that can be understood by scanner 62. Monitor 96 is preferably an interactive touch screen monitor that allows commands to be input to computer 54 by touching the screen of the monitor. Alternatively, commands may be entered through a keyboard or mouse.

Interface/buffer board 110 includes interface 112 and buffer 114 image data is stored in buffer 114 when the data can not be immediately read by computer 54. Buffer 114 is preferably a first-in first-out (FIFO) buffer. Interface 112 is preferably an IEEE 1394 serial interface, which is also known as "Firewire". IEEE 1394 is a high-speed, non-proprietary, platform-independent serial bus for transferring digital data between digital devices such as computers, printers, hard drives and digital audio and video hardware. Interface 112 allows for real-time processing of image data. Interface 112 supports devices operating at different speeds, ranging from 100 Mbps to 400 Mbps. Serial and parallel interfaces are attachable to interface 112 through a Legacy I/O bridge. Interface 112 can interface with the higher layers of the new IEEE 1284 parallel port standard. Interface 112 transmits high resolution image data to computer 54, and also transmits command, control and status information between scanner 62 and computer 54.

Interface 112 includes two sets of registers. A first set of registers is dedicated to CCD/acquisition board 116 and a second set of registers is dedicated to subsystems 130A–130G (which will be referred to collectively as subsystems 130). When computer 54 wants to send data to CCD/acquisition board 116, computer 54 writes the data to the first set of registers in interface 112. When computer 54 wants to send data to one of subsystems 130, it writes the data to the second set of registers in interface 112. Interface 112 forwards the data on the appropriate output line. In a preferred embodiment, interface/buffer board 110 plugs directly into the motherboard of computer 54. Alternatively, computer 54 may already have a 1394 interface built in.

Scanner 62 includes CCD/acquisition board 116, stepper motor subsystem 130A, drive motor subsystem 130B, light source subsystem 130C, DX code subsystem 130D, knobs subsystem 130E, magnetic subsystem 130F and switches subsystem 130G. CCD/acquisition board 116 includes A/D converter 118, offset amplifier 120, gain amplifier 122, light sensor 124 and signal generator 126. In a preferred embodiment, CCD/acquisition board 116 is coupled to interface/buffer board 110 by a parallel interface. Light sensor 124 is preferably a Kodak KLI-2113 image sensor. When light sensor 124 heats up during operation, it may exhibit thermal noise. The heat is preferably dissipated by adding a heat sink to light sensor 124 or adding some other type of cooling means, such as a fan.

When light is projected through a film strip, a film image is generated. The film image is directed onto light sensor 124. Light sensor 124 has three parallel linear photodiode arrays. Each linear photodiode array consists of 2,098 photosites. The film image can be focused on all 2098 of the photosites of each array, or any subset of the photosites. In a preferred embodiment, 2048 photosites are used for 35 mm film, and the total image size is 2048×3072. For APS film, 1728 photosites are used, and the total image size is 1728×3072. One array of photosites is covered with a red filter stripe, the second array is covered with a green filter stripe, and the third array is covered with a blue filter stripe. Each photosite covered by a red filter stripe outputs a signal that varies according to the intensity of red light incident on that photo site. Similarly, each photosite covered by a green or blue filter stripe outputs a signal that varies according to the intensity of green or blue light, respectively, incident on the photosite. Each photosite has a charge coupled device (CCD) that produces the signal for that photosite. The amplitude of the signal for each photosite builds up during a specified integration period, and at the end of that period, the signals are output to CCD registers. There is a separate CCD register for each array of photosites. Thus, each CCD register holds intensity data for a single color. Light sensor 124 has three outputs to output the intensity data stored in the CCD registers, although only a single output is shown in FIG. 3. As a film strip is advanced through scanner 62, the projected film image changes and new red, green, and blue intensity data is output from light sensor 124.

Signal generator circuit 126 controls the length of the integration period of light sensor 124, and generates signals to clock data out of light sensor 124 at the end of each integration period. In a preferred embodiment, the pixel clock rate is 2 MHz.

Offset amplifier 120 and gain amplifier 122 are analog amplifiers which amplify each of the three color channels output by light sensor 124, and pass the amplified signals on to A/D converter 118. The magnitude of the offset and gain are programmable, and may be changed by the user with computer 54. Programming the offset and gain is discussed in more detail below with respect to FIG. 4. A/D converter 118 receives the amplified signals, converts the signals to digital data, and outputs a multiplexed RGB signal at 12–16 bits per color and 6 MHz (i.e., 3 color channels×2 MHz/channel).

Subsystems, 130 are connected to each other and to interface/buffer board 110 by bus 128. Bus 128 is preferably a daisy-chained ribbon cable. Each subsystem 130A–130G has its own microprocessor 132A–132G, respectively, which is assigned a unique ID. In a preferred embodiment, each microprocessor 132A–132G includes an internal ID, although other ID assignment schemes may be used such as assigning IDs with dip switches. Microprocessors 132A–132G are preferably single-chip PIC processors. For each separate subsystem 130, the hardware for that subsystem are preferably located on a single circuit board located near the components being monitored or controlled by that subsystem. Each microprocessor 132A–132G includes an associated memory for storing a control program that defines the operations to be performed by that microprocessor. Computer 54 sends signals through interface/buffer board 110 addressed to any one of subsystems 130 using the subsystem's-unique ID.

Stepper motor subsystem 130A includes microprocessor 132A and stepper motors 134A and 134B. Stepper motor 134A controls the position of lens 136, and stepper motor 134B controls the position of light sensor 124 (see FIGS. 9–10). Lens 136 and light sensor 124 are each moved to one of four different positions, depending upon what is being scanned. Lens 136 and light sensor 124 are each moved to a first position when 35 mm film is scanned, a second position when APS film is scanned, a third position when a 35 mm slide is scanned and a fourth position when an APS slide is scanned. At start-up, lens 136 and light sensor 124 are moved to a zero or default position. Zero position sensors 138A and 138B (see FIGS. 9–10) provide a zero indication to microprocessor 132A when light sensor 124 and lens 136 are at their default positions.

Drive motor subsystem 130B includes microprocessor 132B, motor 150 and encoder 152. Motor 150 is a part of a film drive assembly that drives a film strip or slide mount through scanner 62. Motor 150 is preferably a DC motor. Microprocessor 132B monitors the speed of motor 150 by storing and counting pulses that are received from encoder 152. Microprocessor 132B counts the number of pulses received from encoder 152 in a specified time period and determines whether motor 150 is running at the proper speed. If motor 150 is not running at the proper speed, microprocessor 132B adjusts the speed of motor 150 until it is correct. Microprocessor 132B receives signals from computer 54 to start, stop, and adjust the speed of motor 150.

Light source subsystem 130C includes microprocessor 132C and light source 172. Light source 172 projects light through film strips and slides onto light sensor 124. Light source 172 is preferably a cold cathode fluorescent bulb. Alternatively, a halogen bulb with a condenser may be used for light source 172. Microprocessor 132C receives signals from computer 54 to turn light source 172 on and off.

DX code subsystem 130D includes microprocessor 132D and DX code sensors 190A and 190B. Each DX code sensor 190 includes two pairs of emitters and detectors. The emitters are preferably light emitting diodes (LEDs) and the detectors are preferably phototransistors. A DX code sensor 190 is placed on each side of a film strip. DX code information includes film product class number, film specifier, frame numbers, filmstrip type, filmstrip ID number and filmstrip length. DX code sensors 190 detect the coded data on a film strip and transmit signals representative of the coded data to microprocessor 132D. Microprocessor 132D relays the coded data back to computer 54 for processing.

Knobs subsystem 130E includes microprocessor 132E, film size knob sensor 210 and film color knob sensor 212. Film size knob sensor 210 is coupled to film size knob 66 and senses the position of film size knob 66. Film size knob sensor 210 provides a position indication signal to microprocessor 132E when a user changes the position of film size knob 66. Microprocessor 132E sends the position indication to computer 54, where it is used by application 100.

Film color knob sensor 212 is coupled to film color knob 64 and senses the position of film color knob 64. Film color knob sensor 212 provides a position indication signal to microprocessor 132E when a user changes the position of film color knob 64. Microprocessor 132E sends the position indication to computer 54, where it is used by application 100.

Magnetic sensor subsystem 130F includes microprocessor 132F and magnetic read/write apparatus 230. Magnetic read/write apparatus 230 reads, writes and overwrites magnetic-based data on a film strip. The data represents camera information, photo-finishing information, camera per-frame information and photo-finisher per-frame information. Each frame of a film strip has two tracks that may be used by the camera and two that may be used by photo-finishing equipment. Computer 54 sends write signals to microprocessor 132F instructing it to write magnetic data to a film strip. Microprocessor 132F receives the write signals and causes read/write apparatus 230 to record the appropriate data on the film strip. Read/write apparatus 230 also reads magnetic data from a film strip and passes it on to microprocessor 132F. Microprocessor 132F transmits the received data to computer 54 for processing. Magnetic sensor subsystem 130F is not a necessary part of the present invention, but provides additional functionality that may be desirable to particular users.

Switch subsystem 130G comprises microprocessor 132G. Microprocessor 132G monitors start/stop switch 72 and forward/reverse switch 76. When a switch is moved, microprocessor 132G identifies which switch was moved and transmits the new position of the switch to computer 54.

Figure 4:
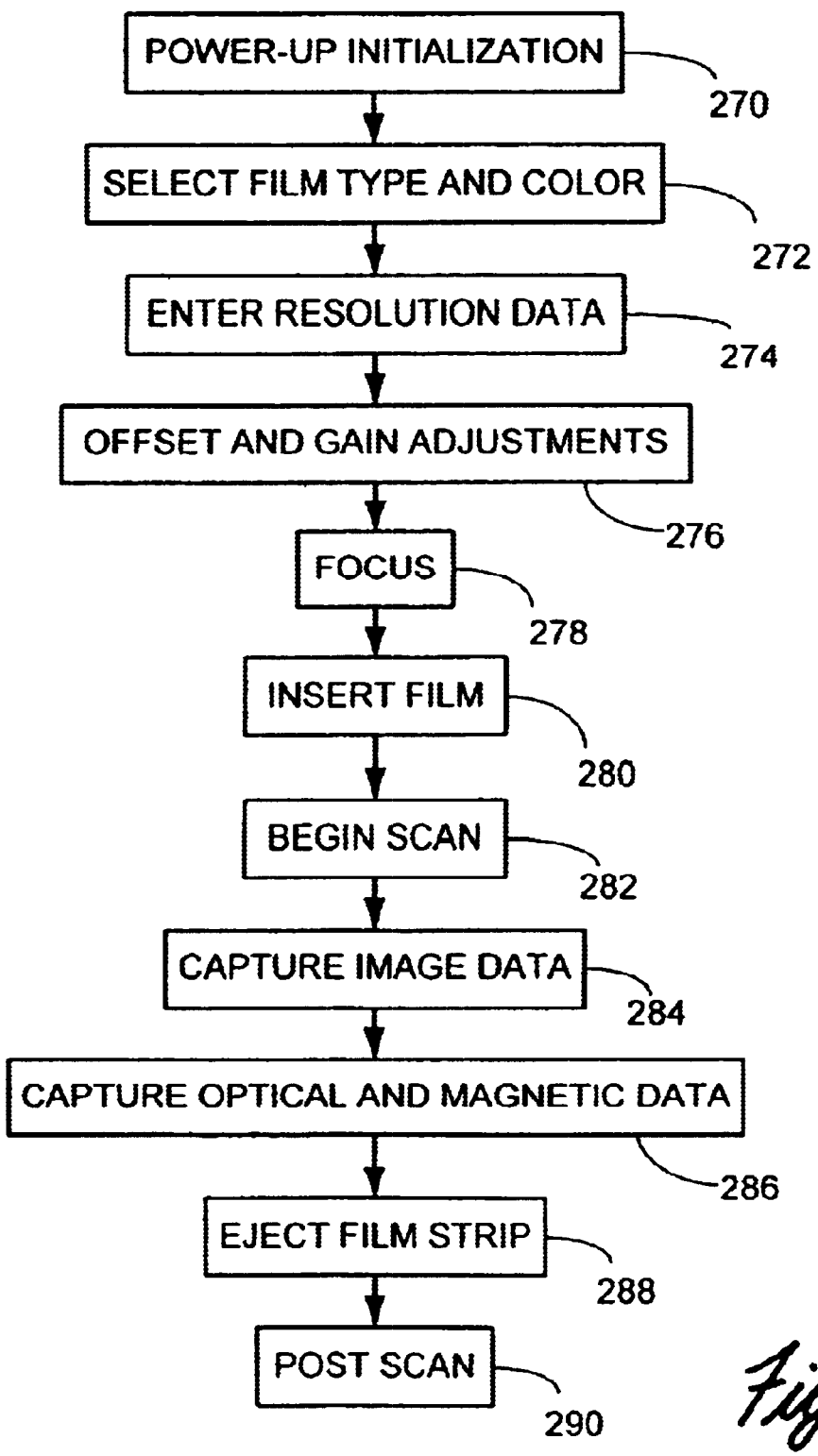
FIG. 4 shows a flow diagram of a typical scan sequence.

FIG. 4 shows a flow diagram of a typical sequence of events that occurs during a scan. A first step performed by scanning system 52 is a power-up initialization. (Block 270). On power-up, scanner 62 performs a self-test diagnostic, provides power to the digital electronics and sets the initial states of the digital electronics. Any errors resulting from the self-test are sent from the appropriate subsystem 130 or CCD/acquisition board ~16 to computer 54 for processing.

Also during the power-up initialization step, light sensor 124 and lens 136 are each moved to a zero or default position. Zero position sensors 138A and 138B (see FIGS. 9–10) provide a zero indication to microprocessor 132A when light sensor 124 and lens 136 are at their default positions. Microprocessor 132A drives motors 134A and 134B until it receives the zero indication from zero position sensors 138A and 138B.

Pixel normalization images are also obtained during power-up, which are later used for pixel by pixel offset and gain corrections. There are variations in the responsiveness of the pixel elements on light sensor 124. Performing an offset function on a pixel by pixel basis corrects the variations and ensures a uniform output from light sensor 124. The offset is calculated for each pixel element by first obtaining the output of each pixel element with light source 172 off (i.e., pure black). Thus, before a film strip is inserted in scanner 62 and before light source 172 is turned on, CCD/acquisition board 116 takes a sample image. This sample image is referred to as a pixel normalization image and is used later for pixel by pixel offset corrections. The pixel normalization image is transmitted from CCD/acquisition board 116 to computer 54, where it is stored in memory 106.

The outputs of the pixel elements of light sensor 124 also typically vary from pixel to pixel when light source 172 is on and before a film strip is inserted. The differences are attributable to varying sensitivities of the pixel elements, and variations in the light intensity across the width of light source 172. Thus, a gain function is determined for each pixel element to compensate for the deviations in output levels and to provide a uniform output. To determine the gain for each pixel element, light source 172 is turned on during power-up. Computer 54 turns on light source 172 by sending an appropriate signal to light source subsystem 130C. Microprocessor 132C receives the signal and responds by turning on light source 172. A second pixel normalization image is captured by CCD/acquisition board 116 and transmitted back to computer 54, which stores the image in main memory 106. The pixel normalization image is later used by computer 54 for pixel by pixel gain corrections. Pixel normalization images may also be captured immediately prior to each scan, since gain and offset values may change as light source 172 and light sensor 124 warm-up.

After power-up initialization, the film type and film color are selected. (Block 272). Film size knob 66 is used to select the type of film that will be scanned (e.g., 35 mm or APS). The width of guide track 343 (see FIGS. 6–7 and corresponding discussion) changes in response to movement of film size knob 66 to accommodate the selected film type. Whenever film size knob 66 is moved from its current position, sensor 210 provides a signal to microprocessor 132E identifying the current position of the knob 66. Microprocessor 132E stores the current position of knob 66 until polled by computer 54, at which time microprocessor 132E transfers the information to computer 54. The position of film size knob 66 is used by computer 54 for image processing functions. In addition, computer 54 generates a film type signal based on the position of film size knob 66, and transmits the film type signal to stepper motor subsystem 130A. Stepper motor subsystem 130A uses the film type data to properly position lens 136 and light sensor 124.

Using film color knob 64, a user selects positive film, negative film or black and white film. Whenever film color knob 64 is moved from its current position, sensor 212 provides a signal to microprocessor 132E identifying the current position of knob 64. Microprocessor 132E stores the current position of knob 64 until polled by computer 54. When it is polled, microprocessor 132E transmits the position information to computer 54. The position of film color knob 64 is used by computer 54 for image processing functions.

After knobs 64 and 66 have been properly positioned, resolution data is input by the user. (Block 274). In a preferred embodiment, the resolution is entered through a dialog box displayed on monitor 96. Users can select high resolution, medium resolution or low resolution. For 35 mm film, these resolutions correspond to 2048×3072, 1024× 1536 and 512×768, respectively. The resolution data is used by computer 54 to set the appropriate scanning speed. A 35 mm film image is always focused on 2048 pixel elements of light sensor 124. To reduce the resolution in the horizontal direction, a pixel averaging function is performed by computer 54, which is discussed below with respect to FIG. 5. If the vertical resolution is reduced, the transport speed of a film strip is increased. If the vertical resolution is reduced by a factor of 2 (i.e., the resolution is changed from high to medium), the transport speed is increased by a factor of 2. If the vertical resolution is reduced by a factor of 4 (i.e., the resolution is changed from high to low), the transport speed is increased by a factor of 4.

The selected resolution is also used by computer 54, in conjunction with the selected film type and film color, to determine the appropriate offset and gain to use. (Block 276). The appropriate offset and gain are programmed into offset amplifier 120 and gain amplifier 122. Offset amplifier 120 and gain amplifier 122 are analog amplifiers which amplify each of the three color channels output by light sensor 124. Offset amplifier 120 and gain amplifier 122 are programmed from computer 54 by transmitting offset and gain data for each of the three color channels through interface/buffer board 110 to CCD/acquisition board 116. Offset amplifier 120 and gain amplifier 122 adjust their amplification according to the received offset and gain data. Throughout each day and throughout the lifetime of light source 172, the light intensity may change. Each of the three color channels in light sensor 124 may be affected differently, and exhibit varying performance. Therefore, computer 54 preferably examines pixel normalization images on a periodic basis and adjusts each color channel separately with new gains and offsets.

The next step in the scan sequence is focusing of scanner 62. (Block 278). Focus is performed automatically for each of the film and slide formats. There are preferably four different sets of positions for lens 136 and light sensor 124. The first position corresponds to 35 mm film, the second position corresponds to APS film, the third position corresponds to 35 mm slides and, the fourth position corresponds to APS slides. The positions are defined with reference to the zero or default position of lens 136 and light sensor 124. For each of the film and slide formats, microprocessor 132A knows exactly how far lens 136 and light sensor 124 must be removed from the zero position to be in the appropriate position for scanning the film or slide. When microprocessor 132A receives a film type signal from computer 54, microprocessor 132A sends signals to stepper motors 134A and 134B, causing stepper motors 134 to move lens 136 and light sensor 124 to the appropriate positions for the identified film or slide format.

After scanner 62 has been focused, a film strip or slide mount is inserted. (Block 280). A scan is then initiated by moving start/stop switch 72 into the start position. (Block 282). Microprocessor 132G senses the movement of switch 72, and sends a start signal to computer 54. Computer 54 responds by sending a start motor signal and motor speed data to drive motor subsystem 130B. Microprocessor 132B receives the start motor signal and motor speed data and causes motor 150 to begin operating at the speed specified by the motor speed data. The film strip or slide mount is driven through scanner 62 at the specified speed.

As the film strip or slide mount is advanced through scanner 62, it passes between light source 172 and lens 136. Light source 172 projects light through the film and generates a film image. Lens 136 directs the film image onto light sensor 124, where image data is captured. (Block 284). The film strip or slide mount is advanced between light source 172 and lens 136 at a substantially constant velocity by motor 150, and new image data is constantly being captured. The image data is amplified by amplifiers 120 and 122, converted to 12–16 bits digital image data by A/D converter 118, and stored in buffer 114.

Figure 5:
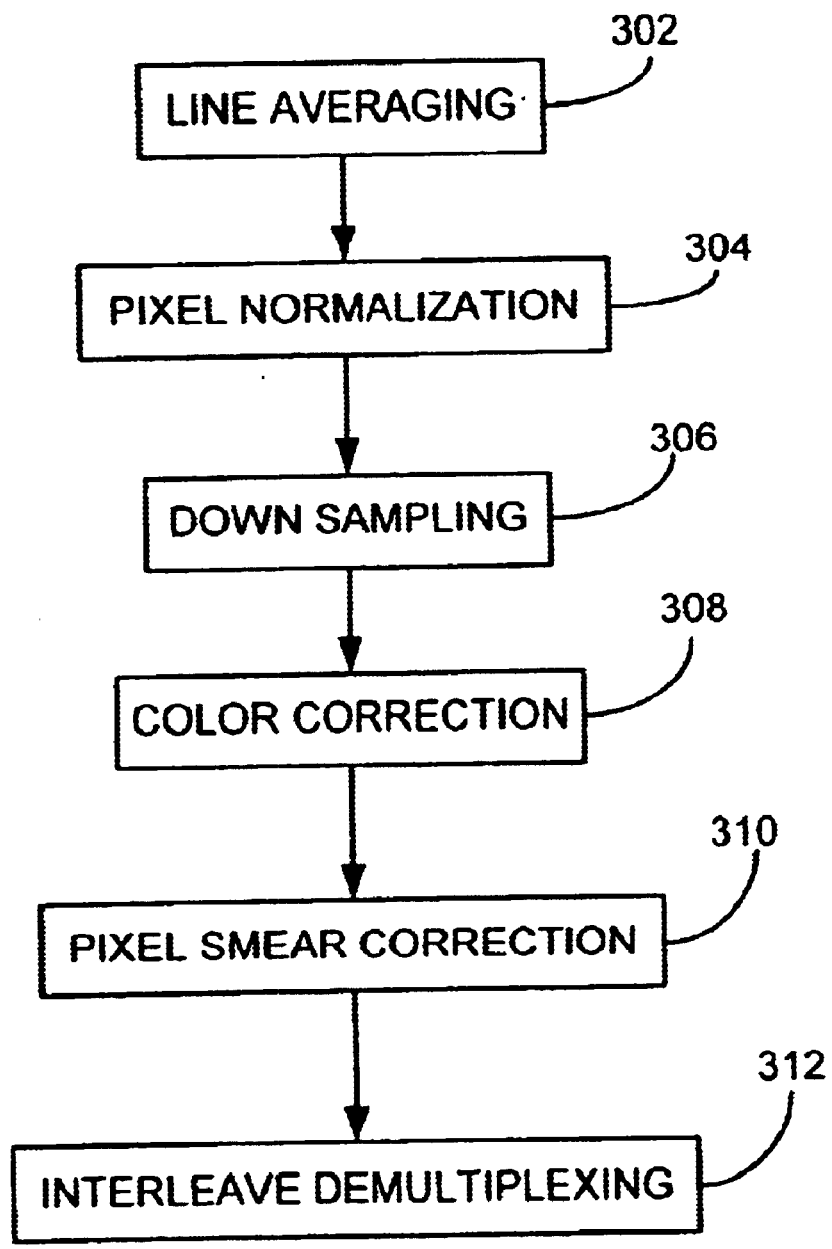
FIG. 5 shows a flow diagram of data processing operations performed on image data.

During a scan, computer 54 obtains the 12–16 bit image data from buffer 114 by polling buffer 114 through interface 112. In response to the polling, buffer 114 transfers the image data to computer 54. When computer 54 receives image data from interface/buffer board 110, the image data is initially stored in main memory 106. While the image data is stored in main memory. 106, computer 54 performs a series of operations on the image data. FIG. 5 shows a summary of operations performed on the image data.

Scanner 62 continues to scan a film strip or slide mount until the trailing edge is reached. When the trailing edge is reached, light sensor 124 goes into saturation because of the absence of a film. When computer 54 receives the image data indicating that light sensor 124 is in saturation computer 54 sends an off signal to drive motor subsystem 130B, instructing microprocessor 132B to turn off motor 150. In a preferred embodiment, the scan time for a roll of film is about 2 minutes for high resolution, a minute for medium resolution and about a half minute for low resolution.

While image data is being captured, DX code data and magnetic data is also being captured and transmitted to computer 54. (Block 286). DX code sensors 190 detect the coded data on a film strip and transmit signals representative of the coded data to microprocessor 132D. Microprocessor 132D relays the coded data back to computer 54 for processing. From the DX code, computer 54 identifies the frame number of each photographic image and the manufacturer of the film. Read/write apparatus 230 reads magnetic data from a film strip and passes it on to microprocessor 132F. Microprocessor 132F transmits the received data to computer 54 for processing.

After a film strip has been scanned, it is ejected through film outlet 68. (Block 288). Slide mounts are ejected through slide outlet 70.

Computer 54 performs several operations on the image data stored in memory 106. These operations are described below with respect to FIG. 5. After the image data has been processed and manipulated by computer 54, digital images are displayed on monitor 96. After viewing the images on monitor 96, a user may select certain images to be scanned again. The re-scanning of selected images is referred to as a post scan. (Block 290). The film strip is again inserted into scanner 62. Alternatively, the film strip may be held by film outlet 68 after the first scan, and then brought back into scanner 62 by reversing the direction of film transport. New offset and gain values may be entered into computer 54 by a user. The new offset and gain values are transmitted from computer 54 to CCD/acquisition board 116, and used by offset amplifier 120 and gain amplifier 122. A change in the offset and gain can provide a fuller color depth for each color channel, and thereby produce a better quality image. Computer 54 causes drive motor subsystem 130B to advance the film strip to each of the selected images, and new image data is obtained for the selected images. The film strip is advanced to the trailing edge and is ejected through film outlet 68.

II. Image Data Manipulation and Image Display

FIG. 5 shows a flow diagram of data processing routines performed by computer 54. The routines are preferably written in assembly code utilizing MMX instructions to optimize the code and provide increased speed. The routines are preferably performed by computer 54, rather than dedicated hardware and software within scanner 62, to take advantage of the increasing performance of computers and to reduce the complexity of the electronic design of scanner 62.

During scanning, computer 54 performs a line averaging routine on image data as it is being received. (Block 302). The line averaging routine calculates the average intensity of each red line, green line and blue line for each scan line. The line averaging routine is used to identify the location of image frames within the image data representing the entire film strip. When images are created on a film, varying densities of silver are deposited on a substrate layer. In the area between image frames, there is only the substrate layer with no silver deposits. Thus, when light is projected through the film, the light going through the area between image frames has a high-intensity because there are no silver deposits to block the light. These boundaries between image frames are identified, then, by calculating the average intensity of each scan line. A high average intensity indicates that the scan line is a frame boundary.

In addition to the boundaries between images (which are the left and right boundaries of the images), the top and bottom boundaries of the images are found using the same technique.

There are variations in the responsiveness of the pixel elements on light sensor 124. During the pixel normalization step (Block 304), offset and gain functions are performed on a pixel by pixel basis to correct the variations. As described above, a pixel normalization image is captured when light source 172 is off, and again when light source 172 is turned on. Computer 54 examines these pixel normalization images and identifies an offset and gain for each pixel element. The identified offsets and gains are then applied by computer 54 to the image data stored in main memory 106. The pixel normalization step is preferably performed during a scan as the image data is being received by computer 54.

To reduce the time required to perform calculations and corrections on the image data stored in main memory 106, each digital image is down-sampled to a 512×768 image. (Block 306). The down-sampled image data is stored in low-resolution buffer 102. The full size image data is stored in disk buffer 108. The resolution of the image data stored in buffer 108 is the resolution selected by the user at the start of the scan. During the down-sampling, computer 54 performs an averaging function, which involves calculation of an average intensity for a particular number of pixels. These pixels are then replaced by a single pixel with the calculated average intensity. For example, to reduce an image by a factor of four, every four pixels would be replaced by a single pixel with an intensity equal to the average intensity of the four pixels.

A color correction algorithm is performed on each individual image stored in low-resolution buffer 102. (Block 308). Color correction operations are discussed in commonly-assigned U.S. Pat. No. 5,872,591. Inputs to the color correction algorithm include DX code data, the type and color of the film, the gain and offset values programmed into CCD/acquisition board 116, and a pointer to the uncorrected reference image (i.e., one of the low resolution images stored in low resolution buffer 102). In addition, the color correction algorithm uses a series of files containing calibration values for various film types. The color correction algorithm identifies the appropriate files to use based on the type of film scanned. The output of the color correction algorithm is a red; green and blue look-up table (LUT), and a value indicating whether the operation was successful or not. The LUT is later applied to the high resolution data stored in disk buffer 108.

The LUTs generated by the color correction algorithm are applied to the uncorrected reference images (stored in low-resolution buffer 102) to obtain low-resolution corrected images. Computer 54 performs a pixel smear correction and an interleave demultiplexing operation (both discussed below) on the low-resolution corrected images. The low-resolution corrected images are displayed on monitor 96. After viewing the images, a user can change the red, green, blue, dim or brightness values of any of the images. The new values are input to the color correction algorithm and a new LUT is generated. The new LUT is applied to the low-resolution uncorrected reference images stored in low-resolution buffer 102, and a second set of low-resolution corrected images is generated and displayed on monitor 96. If the user indicates that the images are acceptable, the LUT is applied to the high resolution images stored in disk buffer 108. The color corrected high resolution images undergo a pixel smear correction and an interleave demultiplexing operation, and are then displayed on monitor 96 and/or printed out on printer 98.

If certain images are still not acceptable after manually adjusting the various color parameters, because the images are over exposed or under exposed for instance, a second scan of the images may be obtained. The user selects the images to be re-scanned, and chooses a re-scan operation from application program 100. The scan sequence is performed again. Computer 54 adjusts the offset and gain values for amplifiers 120 and 122 to provide better color depth. The film strip is inserted into scanner 62 and the user moves start/stop switch 72 to the start a position. Scanner 62 forwards the film strip to the leading edge of the first image to be re-scanned, and captures new image data. Line averaging, pixel normalization and down-sampling operations are performed on the new image data, and new low-resolution images are stored in low-resolution buffer 102. After the new image data is stored in low-resolution buffer 102, the color correction algorithm is again applied. The color correction algorithm is supplied with pointers to the original, low-resolution, uncorrected images and pointers to the second, low-resolution, uncorrected images. The color correction algorithm looks at the corrections that were made on the original images and makes appropriate adjustments to generate new LUTs that provide better image appearance. The new LUTs are applied to the image data stored in buffers 102 and 108 as discussed above.

A pixel smear correction is preferably performed on image data prior to displaying or printing images. (Block 310). Pixel smear is the loss of contrast occurring in a high contrast region of a film strip, which is caused by the inability of the light sensor capacitors to discharge fast enough. For example, if an extremely light area is surrounded by an extremely dark area in a film strip, the light sensor will tend to darken the light area somewhat and lighten portions of the dark area. It is desirable to apply a pixel smear correction to restore the appropriate contrast.

An eight line interleave demultiplexing operation is also performed on image data prior to displaying or printing images. (Block 312). The need for interleave demultiplexing arises because of the tri-linear structure of light sensor 124. When a scan line is captured, actually three different scan lines are captured (red, green and blue), and there is a physical offset between each of the three captured lines. In a preferred embodiment, the space between captured lines is equivalent to eight lines. Thus, in reconstructing the final image for display or printing line 1 of the red channel is matched with line 9 of the green channel and line 17 of the blue channel, which then becomes line 1 of the image. The remaining lines of the image are similarly reconstructed.

III. Mechanical Construction of the Scanner

To more clearly show the mechanical aspects of the scanner of the present invention, some of the electrical components and cabling are not shown in FIGS. 6–10. If not specifically shown or described otherwise, the electrical components including the various microprocessors 132, are preferably located on small circuit boards mounted near the system elements being monitored or controlled.

FIG. 6 and FIG. 7 show perspective views of scanner 62. Scanner 62 includes film color knob 64, film size knob 66, CCD/acquisition board 116, lens 136, motor 150, base 330, left side plate 332, separator 333A, left slide plate 334, right side plate 336, right slide plate 338, left guides 340A–340B, right guides 342A–342B, pulleys 344A–344C, channels 345 and 347, shafts 350A–350F, springs 351A–351D, lens support 352, light sensor support 354, light tunnel 356, IR filter 358, filter supports 359A–359B, cams 360A–360B, 35 mm/APS attachments 362A–362B, linear bearing 368, belts 372 and 374, drive wheel 376, belt guides 378A–378B, shaft 380 and sensor mounts 388A–388B. 35 mm/APS attachments 362A and 362B are identical in form and function, but are located at different positions within scanner 62. Each of 35 mm/APS attachments 362A and 362B include a left portion 363A, a middle portion 363B and a right portion 363C. Each portion 363A–363C of 35 ml/APS attachments 362A–362B includes a wide region 361A and a narrow region 361B.

Left side plate 332 and right side plate 336 are mounted to base 330, and are attached together by separator 333A. Additional separators 333A may be used to attached left side plate 332 and right side plate 336 together. Left slide plate 334 and right slide plate 338 are slidably mounted between left side plate 332 and right side plate 336. Left guides 340A and 340B are attached to left slide plate 334 (see FIG. 6), and right guides 342A and 342B are similarly attached to right slide plate 338 (see FIG. 7). Channel 347 is formed between left guides 340A and 340B. Similarly, channel 345 is formed between right, guides 342A and 342B. Channels 345 and 347 make up guide track 343, which guides a film strip through scanner 62. Left guides 340 and right guides 342 and are preferably spring-loaded to maintain a constant pressure against a film strip. Spring loading helps to ensure good DX code reading and to minimize drift. Left guides 340 and right guides 342 bend the film longitudinally in a C-shape, with the opening of the "C" facing away from lens 136. The longitudinal bending of the film helps eliminate any transverse bending and provides for a clearer scan.

The width of guide track 343 (i.e., the distance between left guides 340 and right guides 342) is manually adjustable by film size knob 66. Film size knob 66 is attached to shaft 350E, which extends through right side plate 336, right slide plate 338, left slide plate 334, and is rotatably attached to left side plate 332. 35 mm/APS attachment 362A includes left portion 363A, middle portion 363B and portion 363C (see FIG. 7). Middle portion 363B is cylindrically shaped with ends that are slanted. The slanted ends of middle portion 363B result in middle portion 363B having a wide region 361A, and a narrow region 361B. Middle portion 363B is mounted on shaft 350E and rotates when shaft 350E rotates. Left portion 363A and right portion 363C are mounted on left slide plate 334 and right slide plate 338, respectively. Left portion 363A and right portion 363C are each cylindrically shaped, and each includes a slanted end that faces middle portion 363B. The slanted ends of left portion 363A and right portion 363C are preferably slanted at the same angle as the slanted ends of middle portion 363B. Left portion 363A and right portion 363C each include a wide region 361A and a narrow region 361B.

When film size knob 66 is in the 35 mm position (as shown in FIGS. 6 and 7), the wide region 361A of middle portion 363B is aligned with the wide regions 361A of left portion 363A and right portion 363C, thereby causing the width of guide track 343 to be at its widest. Springs 351A, 351B, 351C and 351D (see FIG. 7) surround shafts 350E and 350F and are located between right side plate 336 and right slide plate 338, and between left side plate 332 and left slide plate 334. Springs 351 press against slide plates 334 and 338, forcing the slide plates toward each other. The separation between slide plates 334 and 338 is maintained by 35 mm/APS attachments 362A and 362B.

When film size knob 66 is rotated to the APS position, shaft 350E rotates, causing middle portion 363B to rotate as well. In the APS position, middle portion 363B is rotated so that wide region 361A of the middle portion 363B is aligned with narrow region 361B of left portion 363A and narrow region 361B of right portion 363C. As middle portion 363B rotates from the 35 mm to the APS position, the width of guide track 343 becomes smaller. Springs 351 press against slide plates 334 and 338, forcing the slide plates closer together. Shaft 350E is coupled to shaft 350F by belt 374, so that when shaft 350E is rotated by film size knob 66, shaft 350F also rotates. Shaft 350F is coupled to 35 mm/APS attachment 362B, which operates in the same manner as attachment 362A to maintain the appropriate separation between slide plates 334 and 338.

Scanner 62 may be changed from a 35 mm/APS scanner to a scanner that scans 35 mm film and 46 mm film by replacing 35 mm/APS attachment 362 with a 35 mm/46 mm attachment. The 35 mm/46 attachment has the same general form as attachment 362, but has a different size and slant angles.

Pulleys 344A, 344B and 344C (collectively referred to as pulleys 344) are rotatably mounted on left side plate 332. Shafts 350A, 350B (not visible) and 350C (collectively referred to as shafts 350) are attached to pulleys 344 and extend therefrom through left side plate 332, through left slide plate 334, through right slide plate 338, and are rotatably mounted to right side plate 336. Rollers 348 are slidably mounted on shafts 350, but are not shown to more clearly show other aspects of scanner 62. Rollers for engaging a film strip and driving it through the scanner are discussed in commonly assigned U.S. Pat. No. 5,872,591.

Motor 150 is mounted on base 330. Motor 150 is coupled to drive wheel 376, which is rotatably mounted to left side plate 332. In operation, motor 150 causes drive wheel 376 to rotate at a substantially constant angular velocity. When drive wheel 376 rotates, belt 372 causes pulleys 344 to rotate. Belt guides 378A and 378B are rotatably mounted on left side plate 332, and help maintain the proper tension on belt 372. Film strips are driven through the scanner at a substantially constant velocity to provide clearer scans.

Linear bearing 368 is mounted to base 330. Lens support 352 and light sensor support 354 are slidably mounted on linear bearing 368. Light tunnel 356 extends from lens support 352 to light sensor support 354.

Sensor mounts 388A and 388B are mounted on left slide plate 334. DX code sensors 190 (not shown) are attached to sensor mounts 388 near channel 347. In a preferred embodiment, additional sensor mounts 388 are mounted on right slide plate 338 for housing additional DX code sensors 190. A preferred method for mounting DX code sensors within a scanner is disclosed in commonly assigned U.S. patent application Ser. No. 09/149,612.

IR filter 358 is mounted to scanner 62 by filter supports 359A and 359B. IR filter 358 is permanently positioned in the optical path between light source 172 and lens 136. Light source 172 is not shown in order to more clearly show filters 358 and 214 as well as other features of scanner 62. A preferred method of mounting a light source in a scanner is disclosed in commonly assigned U.S. Pat. No. 5,872,591. IR filter 358 helps to minimize flare from light source 172 and provides an appropriate spectral light output for transmission through a film strip.

Positive filter 214 is positioned behind IR filter 358, and is movable into the optical path between light source 172 and lens 136 by film color knob 64. Film color knob 64 is attached to shaft 380, which extends through right side plate 336, through right slide plate 338 and through left slide plate 334, and is rotatably attached to left side plate 332. Cam 360A is attached to shaft 380 between left side plate 332 and left slide plate 334. Cam 360B is attached to shaft 380 between right side plate 336 and right slide plate 338. Shaft 380 and cams 360 rotate when film color knob 64 rotates. Cams 360 are in contact with the bottom of positive filter 214 and cause positive filter 214 to move up and down. In the down position, positive filter 214 is not in the optical path between light source 172 and lens 136. In the up position, positive filter 214 is in the optical path. Positive filter 214 is preferably reddish in color and acts as a negative mask to help prevent saturation of light sensor 124. Because positive filter 214 is reddish in color, positive filter 214 also performs a color shift function on scanned images because it lets red light through better than other light.

Film color knob 64 has three positions, and cams 360 are appropriately shaped to position positive filter 214 in one of two positions (up or down). If film color knob 64 is in the first position (i.e., negative film), cams 360 position positive filter 214 away from the optical path. For negative film, the base is a dark reddish color and no filter is needed to prevent saturation of light sensor 124. If film color knob 64 is in the second position (i.e., positive film), cams 360 position positive filter 214 in the optical path. Positive film is a lot whiter than negative film, so it is desirable to use a filter to prevent saturation of light sensor 124. If film color knob 64 is in the third position (i.e., black and white film), cams 360 position positive filter 214 in the optical path.

Figure 8:
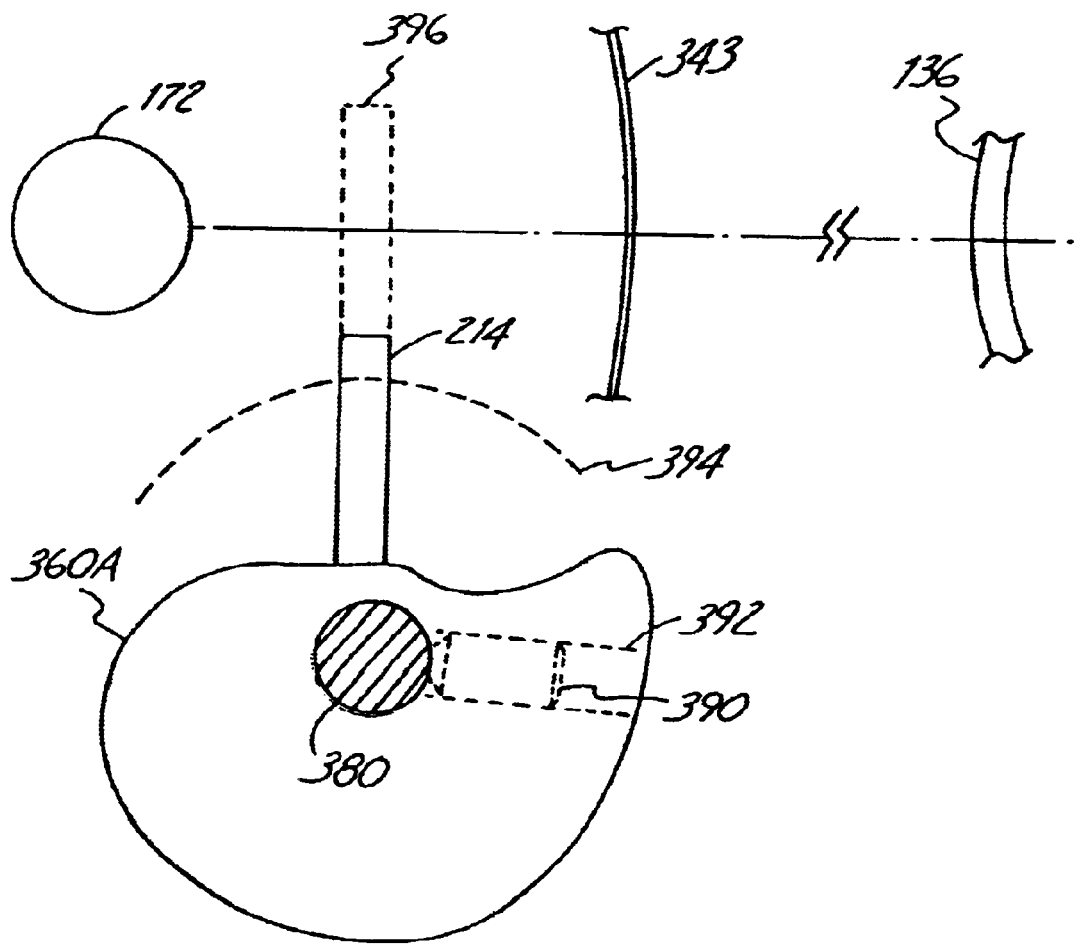
FIG. 8 shows a side view of a cam and a positive filter used in the scanner of the present invention.

FIG. 8 shows a preferred shape for cams 360. As shown in FIG. 8, cam 360A includes bore 392. Set screw 390 is screwed into bore 392. Set screw 390 locks cam 360A onto shaft 380, so that cam 360A rotates when shaft 380 rotates. Positive filter 214 rests on cam 360A. When cam 360A rotates, positive filter 214 is pushed upwards into the position marked by broken line 396, which is in the optical path between light source 172 and lens 136. Guide track 343 is also shown in FIG. 8. Broken line 394 marks the position of cam 360A after it is rotated.

Figure 10:
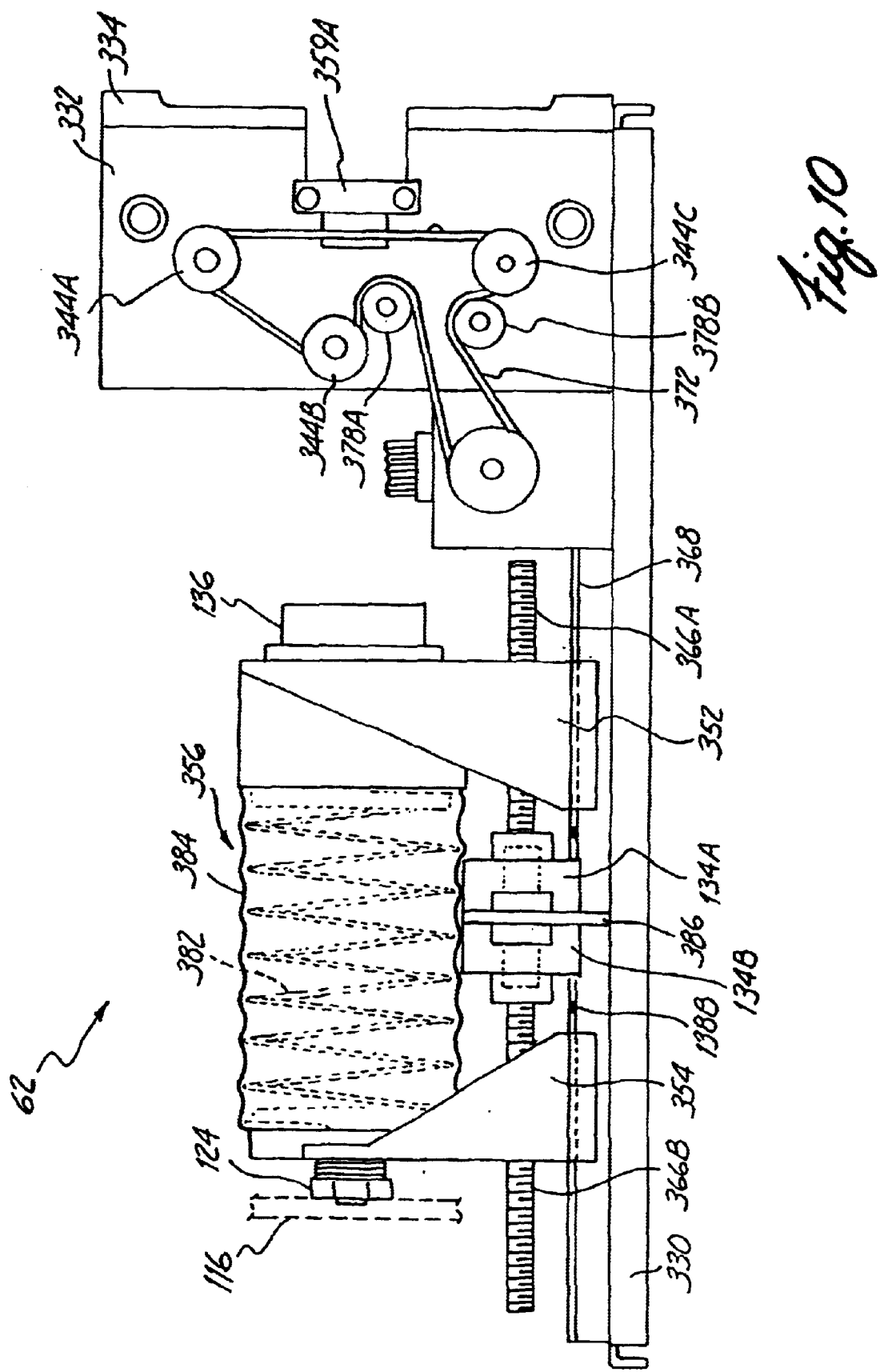
FIG. 10 shows a side view of the left side of the scanner of the present invention.

FIGS. 9 and 10 show side views of scanner 62, and include additional detail for light tunnel 356. FIGS. 9 and 10 also show stepper motors 134A and 134B, which were not shown in FIGS. 6 and 7.

Light tunnel 356 includes spring 382 and cloth 384. Spring 382 provides a spine for cloth 384. Cloth 384 completely covers spring 382. Light tunnel 356 rejects stray light from being incident on light sensor 124, and also prevents dust from blocking the optical path.

Stepper motors 134A and 134B are attached to motor support 386. Motor support 386 is mounted to base 330. Screw 366A is attached to stepper motor 134A, and screw 366B is attached to stepper motor 134B. Stepper motors 134 cause screws 366 to rotate. Screw 366A extends through lens support 352 and engages with threads within lens support 352. When screw 366A rotates, lens support 352 is moved along linear bearing 368. Screw 366B extends through light sensor support 354 and engages with threads within light sensor support 354. When screw 366B is rotated, light sensor support 354 is moved along linear bearing 368.

Zero position sensor 138A is attached to linear bearing 368 near stepper motor 134A, and zero position sensor 138B is attached to linear bearing 368 near stepper motor 134B. When light sensor support 354 passes position sensor 138B, position sensor 138B sends a signal to microprocessor 132A, informing the microprocessor that light sensor support 354 has reached the end of its allowable movement. In response, microprocessor 132A stops motor 134B. Similarly, when support 352 comes in contact with position sensor 138A, position sensor 138A sends a signal to microprocessor 132A, which informs the microprocessor that lens support 352 has reached the end of its allowable movement. Microprocessor 132A then stops motor 134A. Additional position sensors may be used to monitor the positions of light sensor support 354 and lens support 352. When scanner 62 is first powered up, light sensor support 354 and lens support 352 are preferably moved until they pass their respective position sensor 138. Light sensor support 354 and lens support 352 are later moved to new positions based on the type of film to be scanned.

In summary, the image scanning system of the present invention scans slides and film strips containing photographic images and creates a corresponding plurality of digital representations of the photographic images. The scanning system takes advantage of the increasing processing power of personal computers, and makes use of a high-speed interface that allows large bandwidth image data to be transferred from the scanner to the personal computer without the need for down-sampling. The scanning system is scalable to take advantage of increasing computer speeds. The scalable architecture allows for increased performance without having to change scanner hardware or software. The distributed design of the scanning system, which utilizes several microprocessor-based subsystems connected by a single ribbon cable, reduces the necessary cabling and the cost of the system. In addition, the scanning system of the present invention can scan different types of film and slides without the need for hardware configuration changes.

Although the present invention has been described with reference to preferred embodiments, workers skilled in the art will recognize that changes may be made in form and detail without departing from the spirit and scope of the invention.

What is claimed is:

1. A scanner for generating pixel data from photographic film media, the scanner comprising:
   a first and a second inlet, the first inlet adapted to receive a plurality of types of photographic film strips, the second inlet adapted to receive slides;
   film drive means for advancing the media through the scanner;
   a first guide track coupled to the first inlet for guiding the film strips through the scanner;
   a second guide track coupled to the second inlet for guiding the slides through the scanner,
   a light source for projecting light through the film media;
   a light sensor for sensing the light projected through the film media and for generating pixel data based upon the intensity of the light sensed; and
   a lens located between the light source and the light sensor for directing the light projected through the film media onto the light sensor.

2. The scanner of claim 1, and further comprising a film type selection means for manually selecting a type of film to be scanned.

3. The scanner of claim 2 wherein the film type selection means includes a first position and a second position, the first position corresponding to 35 mm film and the second position corresponding to APS film.

4. The scanner of claim 2 wherein the film type selection means includes a first position and a second position, the first position corresponding to 35 mm film and the second position corresponding to 46 mm film.

5. The scanner of claim 1, and further comprising film color selection means for manually selecting a film color.

6. The scanner of claim 5 wherein the film color selection means includes a first, a second and a third position, the first position corresponding to negative film, the second position corresponding to positive film and the third position corresponding to black and white film.

7. The scanner of claim 5, and further comprising a light filter responsive to the film color selection means to move between the light source and the light sensor, the light filter reducing intensity of light incident on the light sensor when positioned between the light source and the light sensor.

8. The scanner of claim 1, and further comprising gain adjustment means for adjusting a gain of the pixel data, and offset adjustment means for adjusting an offset of the pixel data.

9. The scanner of claim 8 wherein the gain adjustment means and the offset adjustment means are programmable by user input.

10. The scanner of claim 1, and further comprising speed adjustment means for automatically adjusting the speed of the film drive means based on user entered scanning resolution data.

11. The scanner of claim 1, and further comprising means for displaying the pixel data.

12. The scanner of claim 2, and further comprising means responsive to the film type selection means for automatically changing the position of the lens and the position of the light sensor to provide proper focus for the selected film type.

13. The scanner of claim 12, and further comprising first and second position sensors, wherein the first position sensor detects when the lens reaches a first predetermined position, and the second position sensor detects when the light sensor reaches a second predetermined position.

14. The scanner of claim 1, and further comprising means for bending the film media longitudinally as it passes between the light source and the light sensor.

15. The scanner of claim 2 wherein the first guide track comprises a left guide to guide a first edge of a film strip and a right guide to guide a second edge of a film strip, and the scanner further comprises guide track adjustment means responsive to the film type selection means for adjusting the distance between the left guide and the right guide.

16. The scanner of claim 1, and further comprising an infrared light filter located between the light source and the tight sensor, the infrared light filter for preventing infrared light from being projected on the light sensor.

17. The scanner of claim 1, and further comprising a light tunnel located between the light source and the light sensor, the light tunnel preventing substantially all light from reaching the light sensor except the light projected through the film media.

18. The scanner of claim 1, and further comprising a code sensor for projecting light through a first edge of the film media where coded data is located, the code sensor generating signals representative of the coded data on the film media.

\* \* \* \* \*